United States Patent [19]

McKillip, Jr.

[11] Patent Number: 5,752,672
[45] Date of Patent: May 19, 1998

[54] REMOTELY CONTROLLABLE ACTUATING DEVICE

[75] Inventor: Robert M. McKillip, Jr., Hopewell, N.J.

[73] Assignee: Continuum Dynamics, Inc., Princeton, N.J.

[21] Appl. No.: 657,031

[22] Filed: May 29, 1996

[51] Int. Cl.$^6$ .................................................. B64C 13/24
[52] U.S. Cl. .............................. 244/75 R; 244/17.25; 244/17.13; 416/24
[58] Field of Search ........................ 244/17.11, 17.25, 244/75 R, 213, 214, 215, 17.13; 416/24, 20 R, 90 R; 60/528, 527; 310/328, 333, 367, 330

[56] References Cited

U.S. PATENT DOCUMENTS

| | | | |
|---|---|---|---|
| 2,624,531 | 1/1953 | Stalker | 244/17.13 |
| 2,642,143 | 6/1953 | Miller | 170/160.25 |
| 2,716,460 | 8/1955 | Young | 170/160.1 |
| 3,042,371 | 7/1962 | Fanti | 253/78 |
| 3,930,626 | 1/1976 | Croswell, Jr. | 244/44 |
| 4,953,098 | 8/1990 | Fischer, Jr. et al. | 244/17.13 |
| 5,114,104 | 5/1992 | Cincotta et al. | 244/219 |
| 5,150,864 | 9/1992 | Roglin et al. | 244/219 |
| 5,224,826 | 7/1993 | Hall et al. | 416/4 |
| 5,242,130 | 9/1993 | Mouille et al. | 244/17.13 |
| 5,366,176 | 11/1994 | Loewy et al. | 244/75 |
| 5,529,458 | 6/1996 | Humherson | 244/75 R |
| 5,588,800 | 12/1996 | Charles et al. | 244/17.13 |
| 5,626,312 | 5/1997 | Head | 244/75 R |

*Primary Examiner*—Galen L. Barefoot
*Attorney, Agent, or Firm*—David M. Quinlan, P.C.

[57] ABSTRACT

An actuating device can change a position of an active member that remains in substantially the same position in the absence of a force of a predetermined magnitude on the active member. The actuating device comprises a shape-memory alloy actuating member for exerting a force when actuated by changing the temperature thereof, which shape-memory alloy actuating member has a portion for connection to the active member for exerting thereon a force having a magnitude at least as large as the predetermined magnitude for moving the active member to a desired position. Actuation circuitry is provided for actuating the shape-memory alloy actuating member by changing the temperature thereof only for the time necessary to move the active member to the desired position. The invention is particularly useful for changing the position of a camber-adjusting tab on a helicopter rotor blade by using two shape-memory alloy members that can act against each other to adjust dynamic properties of the rotor blade as it is rotating.

19 Claims, 2 Drawing Sheets

REMOTELY CONTROLLABLE ACTUATING DEVICE

This invention was made with Government support under contract number NAS2-14071 awarded by NASA. The Government has certain rights in the invention.

BACKGROUND OF THE INVENTION

1. Field of the Invention

The present invention relates to an actuating device, and more particularly to a remotely controllable actuating device having a shape-memory alloy actuating member.

2. Description of Related Art

There are many circumstances in which it is desirable to be able to provide controlled movement of a member that is inaccessible for one reason or another. For example, the member may be used to control the dynamic properties of rapidly rotating machinery for which the most effective manner of control involves monitoring the properties when the machinery is operating. Another example would be the deployment of bulky equipment on a spacecraft.

A particularly important instance of the first example is the necessity of making fine adjustments to the lift of individual helicopter rotor blades. It is necessary to adjust the lift of a rotor blade to address the effects of "1/rev vibration," so-called because it causes vibration of the helicopter airframe at a frequency that is equal to the rotational speed of the rotor.

A primary source of 1/rev vibration is non-uniformity in the mass distribution of individual blades. Such non-uniformity can cause individual blades to produce different lifts because their mass distributions cause them to assume different root-to-tip twists under dynamic conditions. That is, even though the total mass of each rotor blade can be controlled closely, thus eliminating total mass discrepancies as a source of vibration, discrepancies in mass distribution are a separate source of difficulty.

One approach to the problem of 1/rev vibration is to control the rotor blade manufacturing process as tightly as possible and then test each blade dynamically. That way, blades can be assembled by the manufacturer into "sets" for installation on the same helicopter.

However, that approach has some serious drawbacks. For one thing, it increases manufacturing cost because of the additional testing and inventory control it requires. It also makes it difficult to replace single rotor blades damaged beyond repair under operational conditions (such as combat), thus complicating and increasing the cost of maintaining an adequate spare parts supply. In addition, it is difficult to control the manufacturing process within the necessary limits for composite rotor blades. However, perhaps the most serious obstacle to any attempt at preselecting individual rotor blades for inclusion in a "matched set" is that any repairs made to an individual blade will inevitably change the blade's mass distribution, thus reintroducing 1/rev vibration.

Those and other problems involving differences in individual rotor blades are most commonly solved by providing modifications tailored to individual blades. For example, to correct tracking discrepancies between individual blades making up a helicopter rotor ("tracking" being the goal of having all rotor blades travel in the same path in space as they rotate), the lift generated by each blade is adjusted using tabs.

One preferred manner of adjusting tracking uses plastically deformable tabs provided on the trailing edge of each rotor blade. The tabs are attached to the trailing edge of the blade and extend the trailing edge an inch or so. Bending the tabs changes the effective camber of the rotor blade and thus changes the lift it generates.

To adjust tracking, the track of each individual blade is first determined while the rotor is rotating. Early systems used a manual technique for determining the track of each blade, but a preferred approach now is to use sensors to detect vibrations transmitted to the helicopter airframe and calculate possible tab positions using a computer. The rotor is then stopped and the tabs are adjusted by ground personnel using special tools provided for that propose, after which the tracking is again checked and further adjusted, if necessary.

A major problem with this approach is that it requires highly skilled and specially trained personnel, and it is only through a great deal of experience with a particular aircraft that the technique achieves its maximum efficiency. And while it is possible to monitor vibrations during flight and record them with a view to post-flight tab adjustments, there is no way to change the tab angles during flight to reduce vibration.

Another approach involves using a mechanically actuated, servo-controlled flap on each rotor blade. That system is more convenient, but it requires providing for mechanical actuation of the flap on the rotating blade. That increases the weight and complexity of the rotor control system, and is therefore not an ideal solution, either.

Shape-memory alloys are a special class of material that, after being deformed at one temperature (usually room temperature), return to their undeformed shape upon a temperature change (usually heating). Shape-memory alloys are typically a nickel-titanium alloy (55% Ni - 45% Ti), although other alloys are known to possess this property. A typical manner in which the shape-memory alloy temperature is changed is by passing electric current through it to cause resistive heating.

Shape-memory alloys, and other electromechanical transducing systems, have been proposed for actuating airfoil control surfaces, even for helicopter rotor blades. See, for example, U.S. Pat. Nos. 5,114,104, 5,150,864, 5,224,826 and 5,366,176. However, the prior art devices all suffer from various drawbacks. One is mechanical complexity. Another is that known prior art schemes using shape-memory alloys, such as schemes disclosed in the listed patents, require the shape-memory alloy to act against an elastically deformable material. Thus, power requirements are excessive, which is inconsistent with the necessity to minimize weight in an aircraft.

SUMMARY OF THE INVENTION

It is an object of the present invention to provide an actuating device, particularly suited for use with a helicopter rotor blade, using a shape-memory alloy member that avoids the above problems.

In accordance with one aspect of the present invention, an actuating device for changing a position of an active member that remains in substantially the same position in the absence of a force of a predetermined magnitude on the active member, comprises a shape-memory alloy actuating member for exerting a force when actuated by changing the temperature thereof, the shape-memory alloy actuating member having a portion for connection to the active member for exerting thereon a force having a magnitude at least as large as the predetermined magnitude for moving the active member to a desired position when the shape-memory alloy actuating member is actuated, and actuation means for actuating the shape-memory alloy actuating member by changing the temperature thereof only for the time necessary to move the active member to the desired position.

In accordance with another aspect of the present invention, a control system comprises an active member, mounting means for attaching the active member to a base member so that the active member remains in substantially the same position relative to the base member in the absence of a force of a predetermined magnitude on the active member, a shape-memory alloy actuating member having one portion operatively connected to the active member and another portion for operative connection to the base member, wherein actuation of the shape-memory alloy actuating member by changing the temperature thereof exerts on the active member a force having a magnitude at least as large as the predetermined magnitude for moving the active member to a desired position, actuation means for actuating the shape-memory alloy member by changing the temperature thereof, and control means for activating the actuation means to move the active member to the desired position by the force exerted thereon by actuation of the shape-memory alloy actuating member and then terminating activation of the actuating means.

In accordance with still another aspect of the present invention, a rotor having a motion control device comprises plural rotor blades for rotary attachment to an aircraft, a movable member attached to each rotor blade for movement relative thereto for controlling a dynamic property of the rotor blade as it rotates on the aircraft, mounting means for attaching each movable member to a corresponding rotor blade so that the movable member remains in substantially the same position relative to the rotor blade in the absence of a force on the movable member, first and second shape-member alloy actuating members operatively connected between each rotor blade and the corresponding movable member, wherein actuation of the first and second shape-memory alloy actuating members exerts forces on the movable member for moving it relative to the rotor blade, and actuation means for selectively actuating the first and second shape-memory alloy actuating members only for the time necessary to move the movable member to a desired position for causing the dynamic property to assume a desired value.

In accordance with yet another aspect of the present invention, a helicopter having a rotor vibration control device comprises plural lift-generating rotor blades attached to the helicopter for rotation relative thereto, a movable tab attached to each rotor blade for movement relative thereto for controlling a lift generated by the rotor blade as it rotates on the helicopter, mounting means for attaching each tab to a corresponding rotor blade so that the tab remains in substantially the same position relative to the rotor blade in the absence of a force on the tab, first and second shape-memory alloy actuating members operatively connected between each rotor blade and a corresponding movable member, wherein actuation of the first and second shape-memory alloy actuating members exerts forces on the tab for moving it relative to the rotor blade, actuation means for selectively actuating the first and second shape-memory alloy actuating members for moving the tab to change the lift generated by the corresponding rotor blade, and control means for monitoring the vibration induced by rotation of the rotor blades as they rotate on the helicopter and selectively activating the actuation means to change the position of at least one of the tabs to selectively alter the lift generated by individual rotor blades and minimize vibration, and then terminating activation of the actuation means.

In accordance with a yet further aspect of the present invention, a method of installing an actuating device for moving an active member mounted to a base member by mounting means for maintaining the active member in substantially the same position relative to the base member in the absence of a force of a predetermined magnitude on the active member comprises the steps of operatively connecting two shape-memory alloy actuating members to the base member, exerting a predetermined force on each of the shape-memory alloy actuating members to plastically elongate them respective predetermined amounts, and thereafter operatively connecting the shape-memory alloy actuating members to the active member at different locations thereof at which the exertion of force will move the active member in different directions.

BRIEF DESCRIPTION OF THE DRAWINGS

The above objects features and advantages of the present invention will be readily apparent from the detailed description set out below, when taken in conjunction with the accompanying drawings, wherein.

DETAILED DESCRIPTION OF PREFERRED EMBODIMENTS

Figure 1:
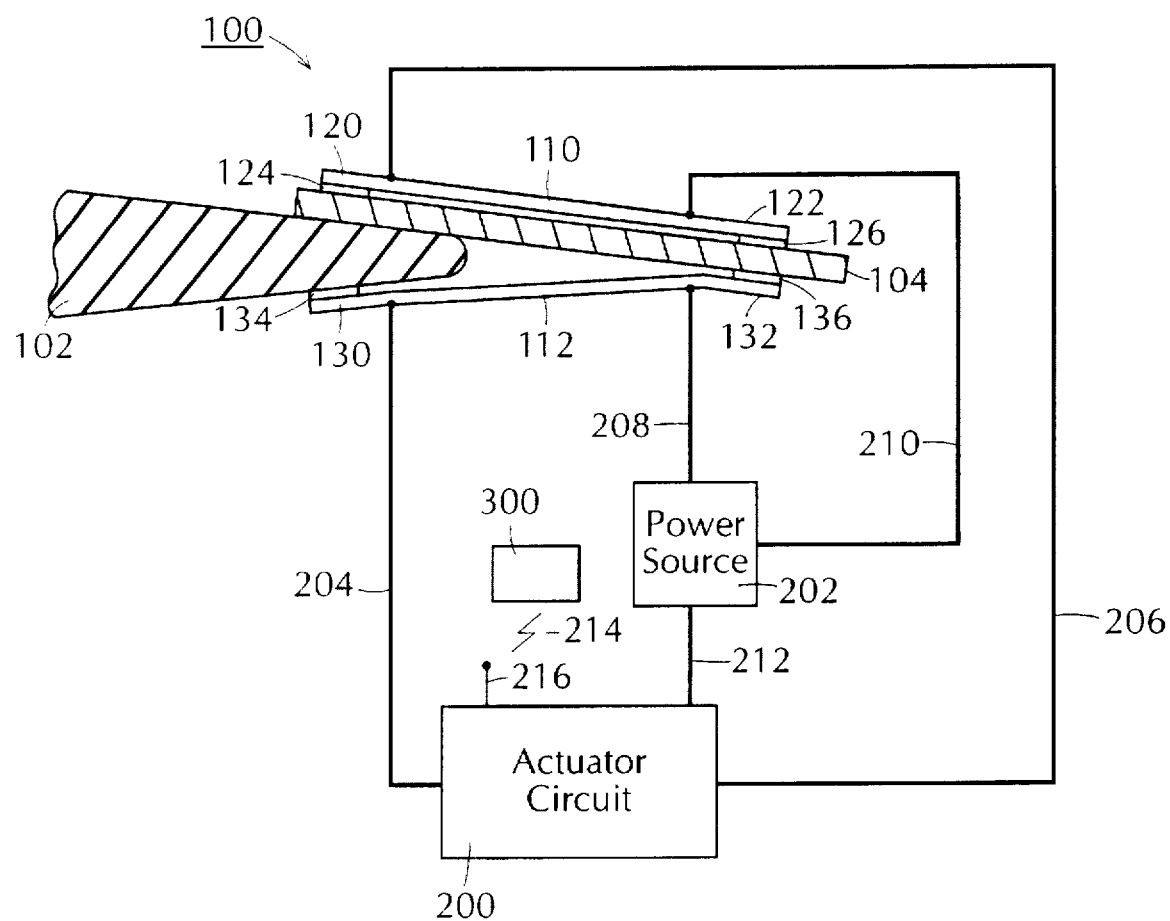
FIG. 1 is a schematic depiction of an embodiment of the present invention used to position a tracking-adjustment tab on a helicopter rotor blade.

FIG. 1 is a schematic representation of an embodiment of the present invention.

An actuating device 100 in accordance with the present invention is shown installed on a helicopter rotor blade 102 having a tab 104 at its trailing edge. The tab 104 is fixed to the rotor blade in any suitable fashion, but preferably by bonding the entire surface area of the tab in contact with the rotor using any adhesive known in the aerospace industry to be suitable for that purpose.

The tab 104 can be identical to prior art tabs provided for adjusting the lift of a helicopter rotor blade, as discussed above. It is made of a material, such as aluminum, that plastically deforms when it is deflected by a fairly low amount. Indeed, one of the advantages of the present invention is that it can be retrofit on helicopter rotor blades having such tabs. As noted above, the prior art technique for adjusting the tab involves using a special tool to bend the tab a predetermined amount to change the camber of the rotor blade.

The actuating device of the present invention uses wires 110 and 112 of a shape-memory alloy such as Nitinol®. Such a shape-memory alloy, if plastically deformed at room temperature, will tend to resume its original shape if heated. Actual changes on a molecular scale to different plastically deformable materials, for example, shape-memory alloy materials in contrast to other types of materials, may be different. However, it should be understood that "plastic deformation" of a body as used herein refers simply to deformation that remains until the body is acted on by an external agent.

In the device shown in FIG. 1, shape-memory alloy wire 110 is attached at its ends 120 and 122 to the tab 104 at bonding sites 124 and 126, respectively. The bonding sites comprise a suitable adhesive that secures the wire 110 to the tab 104. The ends 130 and 132 of the wire 112 are similarly connected at bonding sites 134 and 136. The bonding site 134 is located on the rotor blade 102 essentially at the same position along a chord thereof as the bonding site 124. The bonding site 132 located on the tab 104 in opposing relation to the bonding site 122.

The shape-memory alloy actuating wires 110 and 112 are plastically deformed before attachment at the bonding sites. Typically, the wires are elongated by about 30. Then, to operate the actuating device, one of the wires is heated by passing electric current through it. That causes the wire to contract toward its pre-deformation length, thus bending the tab 104 and changing the camber of the rotor blade 102.

An important feature of the invention is that the tab 104, being made of a plastically deformable material, will remain in the same position relative to the rotor blade 102 until a force is exerted on the tab sufficient to bend it to a different position. Accordingly, once the tab is bent by one of the wires 110 or 112, the wire can be de-energized and the tab will stay in position. That allows the present invention to be used with a lightweight power source, such as batteries actually attached to the rotor blade, thus eliminating complex electrical connections to the rotating blade from the helicopter fuselage.

The actuating device 100 includes actuation means that includes an actuation circuit 200 that controls the flow of current through the respective shape-memory alloy wire members 110 and 112. In a preferred embodiment, the actuation means includes a power source circuit 202 comprising a battery, and the circuits 200 and 202 are mounted to the rotor blade 102 near its root end where it is attached to the helicopter drive shaft. As a result, the actuation circuit 200 and power source circuit 202 have a negligible effect on the dynamic characteristics of the rotor blade.

The actuation circuit 200 is electrically connected proximate to the ends 120 and 130 of the wires 110 and 112 by leads 204 and 206. The battery 202 is connected proximate to the other ends 122 and 132 of the wires 110 and 112 by leads 208 and 210.

The actuation circuit 200 comprises suitable switches for completing an electrical circuit that includes the shape-memory alloy wire 110 and the battery 202 and an electrical circuit that includes the shape-memory alloy wire 112 and the battery 202. A line 212 from the actuation circuit 200 controls switches in the power source circuit 202. The switches in the actuation circuit 200 are actuated by a remote control microprocessor 300 that sends signals 214 to a receiver 216 in the actuation circuit 200.

Figure 2:
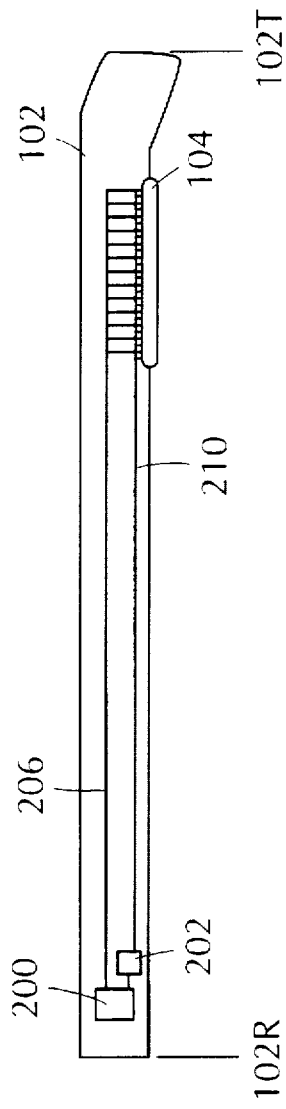
FIG. 2 is top plan view of a helicopter rotor blade incorporating the embodiment of the present invention depicted in FIG. 1.

FIG. 2 is a top plan view of the entire helicopter rotor blade 102. (As used herein, "top," when used in reference to an airfoil, means the direction in which lift is produced.) The tab 104 extends from about 70% of the blade radius, measured from the blade root 102R to the blade tip 102T, to about 85% of the blade radius. (Depiction of the details of the configuration at the blade root 102R where it attaches to the helicopter rotor hub are omitted for clarity.) The width of the tab 104 in the chordwise direction is such that it adds about 7% to the rotor blade chord. For a typical helicopter rotor blade, the tab 104 is about 14 inches long by about one inch wide.

Figure 3:
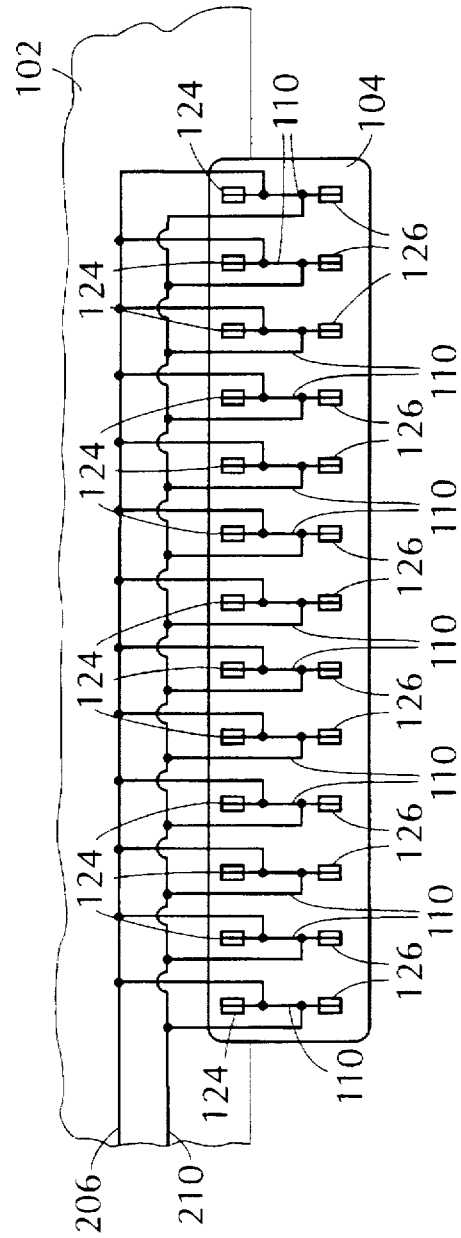
FIG. 3 is a detailed view of the helicopter rotor blade depicted in FIG. 2.

FIG. 3 is a detail plan view of the tab 104 showing the connections of the leads 206 and of the tab 104.

FIG. 3 shows 13 separate wires 110, and a typical spacing between adjacent wires is one inch. The leads 206 and 210 are single wires that run substantially the length of the rotor blade 102 (see FIG. 2). They are firmly bonded to the rotor blade and tab surfaces. Since the leads need to carry only a small amount of current, they can be very small in diameter and may be provided in a thin, flat ribbon shape to reduce drag on the rotor blade. The portions extending in the chordwise direction can be made even smaller, since they each carry only enough current to cause resistance heating of each shape-memory alloy wire 110. (A similar wiring configuration is provided on the unshown underside of the rotor blade.)

As seen in FIG. 2, the actuation circuit 200 and the power source circuit 202 are located as close as possible to the blade root 102R, so that they affect the blade's dynamic characteristics as little as possible. The actuation circuit 200 is generally a solid-state device made as thin as possible to reduce drag. The same is true of the power source circuit 202. In a typical embodiment such as that depicted in FIGS. 2 and 3, each shape-memory alloy wire member 110 is 0.010 inches in diameter.

A shape-memory alloy member is particularly suited for use in adjusting the angle of the tab because such adjustment does not requires a high response time. In fact, it is desirable to change the tab angle over the course of a time period lasting several seconds since that will not introduce transient disturbances in the blade's flight.

In operation, vibration of the helicopter airframe is detected by suitable sensors such as accelerometers (not shown). The output of the accelerometers is provided to the microprocessor 300 (see FIG. 1), which is suitably programmed to provide signals 214 to the actuation circuit 200 for each rotor blade. The desired slow response time of the tab 104 is advantageous in this regard, also, since the bandwidth of any control signal 214 is concomitantly reduced. Alternatively, the control signals 214 can be provided manually by a pilot, in flight, or by a technician in a ground-maintenance operation.

Of course, direct electrical contact between the blade-mounted actuation circuit 200 and a fuselage-mounted control circuit can be made through the rotor hub instead of using a telemetry system as shown in FIG. 1. The principle remains the same, however, in that the position of a remote active member (the tab) otherwise inaccessible, here because it is mounted on a rotating helicopter rotor blade, can be changed.

It is another advantage of the embodiment of the embodiment of the invention shown in FIGS. 1–3 that a relatively small contraction of the shape-memory alloy actuating wires 110 and 112 provide sufficiently large tab deflections to effectively control rotor blade tracking, as seen by the following equation:

$$1 - \cos\frac{\delta_{tab}}{2} = \frac{\Delta}{d} \quad (1)$$

where $\delta_{tab}$ is the deflection of the tab from its undeformed state, $\Delta$ is the amount of deformation of the shape-memory alloy wire 110 or 112, and d is the undeflected length of the wire. While equation (1) represents an idealized hinge joint, it demonstrates that only 0.1% contraction of the wire will provide a tab deflection of about 5°. That should enable the wire to be used well in excess of $10^6$ cycles based on currently available data on shape-memory alloy materials.

It is a feature of the present embodiment of the invention that the wires 110 and 112 act against each other as each is actuated. That is, when the wires 110 are actuated, they cause additional elongation of the wires 112, and vice versa. This has the advantage of allowing adjustment of the tab in both directions.

The invention can incorporate more than one tab along the rotor blade and thus not only adjust its camber but also its twist (by changing the tab angles variable amounts along the rotor blade span). This type of arrangement would be very advantageous for certain types of vertical takeoff and landing (VTOL) aircraft. Such VTOL aircraft act as helicopters when taking off and landing, with their "propeller blades" rotating in a horizontal plane. However, for forward flight the propeller blades assume a position in which they rotate in a vertical plane, thus acting as a traditional propeller. The characteristics of aircraft propeller blades require them to have a much greater root-to-tip twist than helicopter rotor blades for maximum performance. The present invention would enable twist adjustments to be made to optimize both hovering and forward flight in these VTOL aircraft.

It will also be appreciated that the present invention is not limited to use with tabs mounted for plastic deformation relative to a helicopter rotor blade. It in fact is usable with any active member that remains in a position until a force is exerted tending to move it from that position. For example, it will be particularly useful for deploying or changing the orientation of structures, such as solar panels, attached to spacecraft. It can also be used with mechanical devices that hold an active member in a particular position until a force is exerted on the device (akin to the ratchet-type mechanism used in ball-point pens).

The present invention has been described herein in connection with specific embodiments, but those skilled in the art will appreciate that modifications other than those specifically pointed out herein can be made without departing from the spirit of the invention. Accordingly, the scope of the invention is defined solely by the following claims.

What is claimed is:

1. An actuating device for changing a position of an active member mounted to a base member for movement relative thereto so that in the absence of a force of a predetermined magnitude on said active member it remains in a position to which it has been moved, said actuating device comprising:

a plastically elongated shape-memory alloy actuating member for exerting a force by contracting when actuated by changing the temperature thereof, said actuating member being constructed for operative connection between said base member and said active member for exerting on said active member a force having a magnitude at least as large as the predetermined magnitude for moving said active member to a desired position when said actuating member is actuated, wherein said shape-memory alloy actuating member remains contracted upon termination of actuation thereof; and actuation means for actuating said shape-memory alloy actuating member by changing the temperature thereof only for the time necessary to move said active member to the desired position.

2. An actuating device as in claim 1, further comprising a second shape-memory alloy actuating member being constructed for operative connection between said base member and said active member so that contraction of said first-mentioned actuating member plastically elongates said second actuating member, said plastically elongated second actuating member exerting a force by contracting when actuated by changing the temperature thereof to move said active member and plastically elongate said first-mentioned actuating member, wherein said second shape-memory alloy actuating member remains contracted upon termination of actuation thereof and said actuation means is operable for selectively actuating each said actuating member for moving said active member between first and second positions.

3. A control system comprising:

an active member;

mounting means for attaching said active member to a base member for movement relative thereto so that in the absence of a force of a predetermined magnitude on said active member it remains in a position to which it has been moved;

a plastically elongated shape-memory alloy actuating member having one portion operatively connected to said active member and another portion for operative connection to said base member, wherein actuation of said actuating member by changing the temperature thereof contracts said actuating member and exerts on said active member a force having a magnitude at least as large as the predetermined magnitude for moving said active member to a desired position, said shape-memory alloy actuating member remaining contracted upon termination of actuation thereof;

actuation means for actuating said actuating member by changing the temperature thereof; and control means for activating said actuation means to move the active member to the desired position by the force exerted thereon by actuation of said actuating member and then terminating activation of said actuation means.

4. A control system as in claim 3, wherein said active member comprises a tab and said mounting means comprises a plastically deformable portion of said tab, said control system further comprising a second plastically elongated shape-memory alloy actuating member for exerting a force by contracting when actuated by changing the temperature thereof and remaining contracted upon termination of actuation thereof, each said actuating member comprising at least one wire having a portion operatively connected to a different side of said tab and said actuation means being operable for selectively actuating one said actuating member for moving said tab between first and second positions and further plastically elongating the unactuated said actuating member.

5. A control system as in claim 4, wherein said actuation means includes means for selectively supplying electrical current to each said actuating member and said control means includes a switch for terminating the supply of electrical current to each said actuating member.

6. A control system as in claim 5, wherein said control means includes monitoring means for determining when to actuate said switch to terminate the supply of electrical current.

7. A rotor having a motion control device, said rotor comprising:

plural rotor blades for rotary attachment to an aircraft;

a movable member attached to each said rotor blade for movement relative thereto for controlling a dynamic property of said rotor blade as it rotates on said aircraft;

mounting means for attaching each said movable member to a corresponding one of said rotor blades so that in the absence of a force on said movable member it remains in a position to which it has been moved;

first and second plastically elongated shape-memory alloy actuating members operatively connected between each said rotor blade and said corresponding movable member, wherein actuation of each of said first and second actuating members by passing electrical current therethrough contracts the actuated said actuating member and exerts a force on said movable member for moving it relative to the rotor blade and for further plastically elongating the unactuated said actuating member, wherein the actuated said shape-memory alloy actuating member remains contracted upon termination of actuation thereof; and actuation means for selectively actuating said first and second actuating members only for the time necessary to move said corresponding movable member to a desired position for causing the dynamic property to assume a desired value.

8. A rotor as in claim 7, wherein each said movable member comprises a tab attached to a trailing edge of a corresponding said rotor blade for changing the aerodynamic lift thereof by changing the position of said tab.

9. A rotor as in claim 8, wherein each said first shape-memory alloy actuating member comprises a first set of plural wires operatively attached between a top surface of each said tab and a top surface of said corresponding said rotor blade and each said second shape-memory alloy actuating member comprises a second set of plural wires operatively attached between an underside of each said tab and an underside of said corresponding rotor blade.

10. A rotor as in claim 7, wherein said rotor blades comprise helicopter rotor blades and each said movable member comprises a camber-adjusting tab at a trailing edge of said corresponding rotor blade.

11. A rotor as in claim 10, wherein each said tab extends from about 70% of the blade length to about 85% of the blade length as measured from a root end of said rotor blade.

12. A rotor as in claim 11, wherein each said tab adds about 7% to a chord length of said rotor blade.

13. A rotor as in claim 10, further comprising a power source for actuating said shape-memory alloy actuating member, said power source comprising separate battery means mounted on each of said rotor blades proximate to a root end thereof.

14. A rotor as in claim 7, wherein said rotor blades comprise helicopter rotor blades.

15. A rotor as in claim 7, wherein said rotor blades comprise propeller blades of a VTOL aircraft.

16. A helicopter having a rotor vibration control device, said helicopter comprising:

plural lift-generating rotor blades attached to said helicopter for rotation relative thereto;

a movable tab attached to each said rotor blade for movement relative thereto for controlling a lift generated by said rotor blade as it rotates on said helicopter;

mounting means for attaching each said tab to a corresponding one of said rotor blades so that in the absence of a force on said tab it remains in a position to which it has been moved;

first and second plastically elongated shape-memory alloy actuating members operatively connected between each said rotor blade and said corresponding movable member, wherein actuation of each of said first and second shape-memory alloy actuating members by passing electrical current therethrough contracts the actuated said actuating member and exerts a force on said tab for moving it relative to the rotor blade and for further plastically elongating the unactuated said actuating member, wherein the actuated said shape-memory alloy actuating member remains contracted upon termination of actuation thereof;

actuation means for selectively actuating said first and second actuating members for moving said tab to change the lift generated by said corresponding rotor blade; and control means for monitoring the vibration induced by rotation of said rotor blades as they rotate on said helicopter and selectively activating said actuation means to change the position of at least one of said tabs to selectively alter the lift generated by individual said rotor blades and minimize vibration, and then terminating activation of said actuation means.

17. A helicopter as in claim 16, wherein said control means includes transmitting means for transmitting a control signal to said actuation means for activation thereof.

18. A method of installing an actuating device for moving an active member movably mounted to a base member by mounting means for maintaining said active member in a position to which it has been moved in the absence of a force of a predetermined magnitude on said active member, said method comprising the steps of:

operatively connecting two shape-memory alloy actuating members to said base member;

exerting a predetermined force on each of the shape-memory alloy actuating members to plastically elongate them respective predetermined amounts, wherein said actuating members will contract when actuated by changing the temperature thereof and remain contracted upon termination of actuation; and thereafter operatively connecting said shape-memory alloy actuating members to said active member at different locations thereof at which the exertion of force will move said active member in different directions, wherein movement of said active member by actuation of one said actuating member further plastically elongates an unactuated said actuating member.

19. A method as in claim 18, wherein said members are elongated by about 3% in said exerting step.

* * * * *